(12) United States Patent
Huang et al.

(10) Patent No.: US 11,017,565 B1
(45) Date of Patent: May 25, 2021

(54) METHOD AND DEVICE FOR ADAPTIVELY CONTROLLING MULTIMEDIA BLACKBOARD, MEDIUM, AND ELECTRONIC APPARATUS

(71) Applicant: Ambow Sihua intelligent Technology Co., Ltd., Beijing (CN)

(72) Inventors: Jin Huang, Beijing (CN); Qiaoling Xu, Beijing (CN); Gang Huang, Beijing (CN); Kesheng Wang, Beijing (CN); Zhengke Hou, Beijing (CN); Zheyu Wu, Beijing (CN)

(73) Assignee: AMBON SIHUA INTELLIGENT TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/845,446

(22) Filed: Apr. 10, 2020

(30) Foreign Application Priority Data

Mar. 16, 2020 (CN) .......................... 202010183905.2

(51) Int. Cl.
*G06T 7/00* (2017.01)
*G06K 9/00* (2006.01)

(52) U.S. Cl.
CPC ............ *G06T 7/97* (2017.01); *G06K 9/00201* (2013.01); *G06K 9/00248* (2013.01); *G06K 9/00255* (2013.01); *G06K 9/00275* (2013.01)

(58) Field of Classification Search
CPC .. G06T 7/97; G06K 9/00248; G06K 9/00201; G06K 9/00255; G06K 9/00275
See application file for complete search history.

(56) References Cited

U.S. PATENT DOCUMENTS

| 8,164,617 | B2 * | 4/2012 | Mauchly | ............ H04N 5/23238 348/14.08 |
| 9,077,846 | B2 * | 7/2015 | Pradeep | .................. H04N 7/144 |
| 10,706,601 | B2 * | 7/2020 | Svendsen | ................ G06T 11/60 |

* cited by examiner

*Primary Examiner* — Phuoc Tran
(74) *Attorney, Agent, or Firm* — Xsensus LLP

(57) ABSTRACT

The present disclosure provides a method and a device for adaptively controlling a multimedia blackboard, a medium, and an electronic apparatus. In the present disclosure, a three-dimensional model of a target space is established, and a distribution area of the students in a classroom may be obtained by an adaptive algorithm based on the three-dimensional model and an angle of the multimedia blackboard may be automatically controlled to ensure that the students can watch the multimedia blackboard better and reduce the fatigue feeling about the class, which helps in improving an efficiency of having the class.

10 Claims, 7 Drawing Sheets

METHOD AND DEVICE FOR ADAPTIVELY CONTROLLING MULTIMEDIA BLACKBOARD, MEDIUM, AND ELECTRONIC APPARATUS

CROSS-REFERENCE TO RELATED APPLICATION

This Application claims the benefit of Chinese Patent Application No. 202010183905.2 filed on Mar. 16, 2020 in the National Intellectual Property Administration of China, the whole disclosure of which is incorporated herein by reference.

TECHNICAL FIELD

The present disclosure relates to a field of computer, and in particular, to a method and a device for adaptively controlling a multimedia blackboard, a medium, and an electronic apparatus.

BACKGROUND

A traditional blackboard is a plane on which writing can be made repeatedly, and the surface of the board is hard. A blackboard is a writing tool on which writing and erasing can be made repeatedly, and normally used for teaching, conference discussing, or personal and family notes. With the popularization of computer technology, multimedia computer-assisted teaching apparatus has become a common apparatus in classrooms of education institutions. Because the multimedia content must be prepared before a class starts, and thus it is relatively complicated to edit the multimedia content when giving the class. Therefore, multimedia blackboards come into being. The multimedia blackboard combines the functions of multimedia and the functions of traditional blackboards, so that not only a blackboard-writing may be made on the multimedia blackboard, but also multimedia materials may be played on the multimedia blackboard. For example, a multimedia blackboard includes two display areas with one display area displaying a lecture video showing the whole body of the teacher, and the other display area displaying a lecture content of the teacher, such as a PPT lecture content.

Due to a high height and large area of a multimedia blackboard, it is inevitable for a light incident on the multimedia blackboard to be subjected to diffuse reflection and/or specular reflection due to surface material. When the multimedia blackboard is viewed from a certain angle, due to a large intensity of specular reflection, a viewer will feel very dazzling when viewing the multimedia blackboard from such an angle, and cannot see a display content of the multimedia blackboard clearly.

In particular, in a classroom of a university that can accommodate hundreds of people, in order to take care of the listening effect for students in various positions, a fixed position of the multimedia blackboard is more suitable for students in the middle of the classroom to see the display content on the multimedia blackboard comfortably. But when there are only a dozen of students in this classroom listening at the same time, if students are all concentrated in the middle of the classroom, the teacher and students may feel isolated in space, which will degrade the teaching effect.

BRIEF SUMMARY

The summary is provided to introduce concepts in a brief form, which would be further described below in the detailed description. The summary is not intended to indicate key features or essential features of the claimed technical solution, nor is it intended to be used to limit the scope of the claimed technical solution.

The present disclosure provides a method and a device for adaptively controlling a multimedia blackboard, a medium, and an electronic apparatus, which can solve at least one of the technical problems described above. The detailed solutions are as follows.

In one embodiment of the present disclosure, a method for adaptively controlling a multimedia blackboard is provided. The method includes:

acquiring, by multi-view cameras, a plurality of target space images simultaneously, wherein, the multi-view cameras are arranged horizontally in line, and the optical axis of the multi-view cameras are parallel to the original horizontal plane of a spatial rectangular coordinate system; the spatial rectangular coordinate system includes: an origin, a horizontal axis, a vertical axis, and a longitudinal axis, the original horizontal plane is a plane determined by the horizontal axis and the vertical axis;

performing face detection on the target space image to obtain each face area in the target space image;

analyzing the face area of each target space image to obtain a face collection area of each target space image;

determining a corresponding collection area core coordinate based on each face collection area;

determining a three-dimensional core coordinate in the spatial rectangular coordinate system according to the collection area core coordinates of at least two target space images;

acquiring at least three three-dimensional board point coordinates, and determining a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point;

generating a three-dimensional key straight-line according to the three-dimensional key coordinate and the three-dimensional core coordinate;

adjusting the multimedia blackboard based on a preset positional relationship between the three-dimensional key straight-line and the three-dimensional board plane.

According to an embodiment of the present disclosure, in a aspect, the present disclosure provides a device for adaptively controlling a multimedia blackboard, including:

a unit for acquiring target space images, configured to acquire, by multi-view cameras, a plurality of target space images simultaneously, wherein, the multi-view cameras are arranged horizontally in line, and the optical axis of the multi-view cameras are parallel to the original horizontal plane of a spatial rectangular coordinate system; the spatial rectangular coordinate system includes: an origin, a horizontal axis, a vertical axis, and a longitudinal axis, the original horizontal plane is a plane determined by the horizontal axis and the vertical axis;

a unit for obtaining face area, configured to perform face detection on the target space image to obtain each face area in the target space image;

a unit for obtaining face collection area, configured to analyze the face area of each target space image to obtain a face collection area of each target space image;

a unit for determining a collection area core coordinate, configured to determine a corresponding collection area core coordinate based on each face collection area;

a unit for determining a three-dimensional core coordinate, configured to determine a three-dimensional core coordinate in the spatial rectangular coordinate system according to the collection area core coordinates of at least two target space images;

a unit for determining a three-dimensional board plane, configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point;

a unit for generating a three-dimensional key straight-line, configured to generate a three-dimensional key straight-line according to the three-dimensional key coordinate and the three-dimensional core coordinate;

a unit for adjusting the multimedia blackboard, configured to adjust the multimedia blackboard based on a preset positional relationship between the three-dimensional key straight-line and the three-dimensional board plane.

According to an embodiment of the present disclosure, in a aspect, the present disclosure provides a computer-readable storage medium with a computer program stored thereon, which implements the method for adaptively controlling a multimedia blackboard as described in any one of the aspect upon being executed by a processor.

According to an embodiment of the present disclosure, in a aspect, the present disclosure provides an electronic apparatus including: one or more processors; a storage device configured to store one or more programs, which enable the one or more processors to implement the method for adaptively controlling a multimedia blackboard as described in any one of the aspect upon being executed by the one or more processors.

Compared with the prior art, the foregoing solutions in the embodiments of the present disclosure have at least the following technical effects:

The present disclosure provides a method and a device for adaptively controlling a multimedia blackboard, a medium, and an electronic apparatus. In the present disclosure, a three-dimensional model of a target space is established, and a distribution area of the students in a classroom may be obtained by an adaptive algorithm based on the three-dimensional model and an angle of the multimedia blackboard may be automatically controlled to ensure that the students can watch the multimedia blackboard better and reduce the fatigue feeling about the class, which helps in improving an efficiency of having the class.

BRIEF DESCRIPTION OF THE DRAWINGS

The above and other features, advantages, and aspects of the embodiments of the present disclosure will become more obvious with reference to the drawings and the following embodiments. In the drawings, the same or similar reference numbers indicate the same or similar elements. It should be understood that the drawings are schematic and parts and elements are not necessarily drawn to scale. In the drawings.

DETAILED DESCRIPTION

Figure 1:
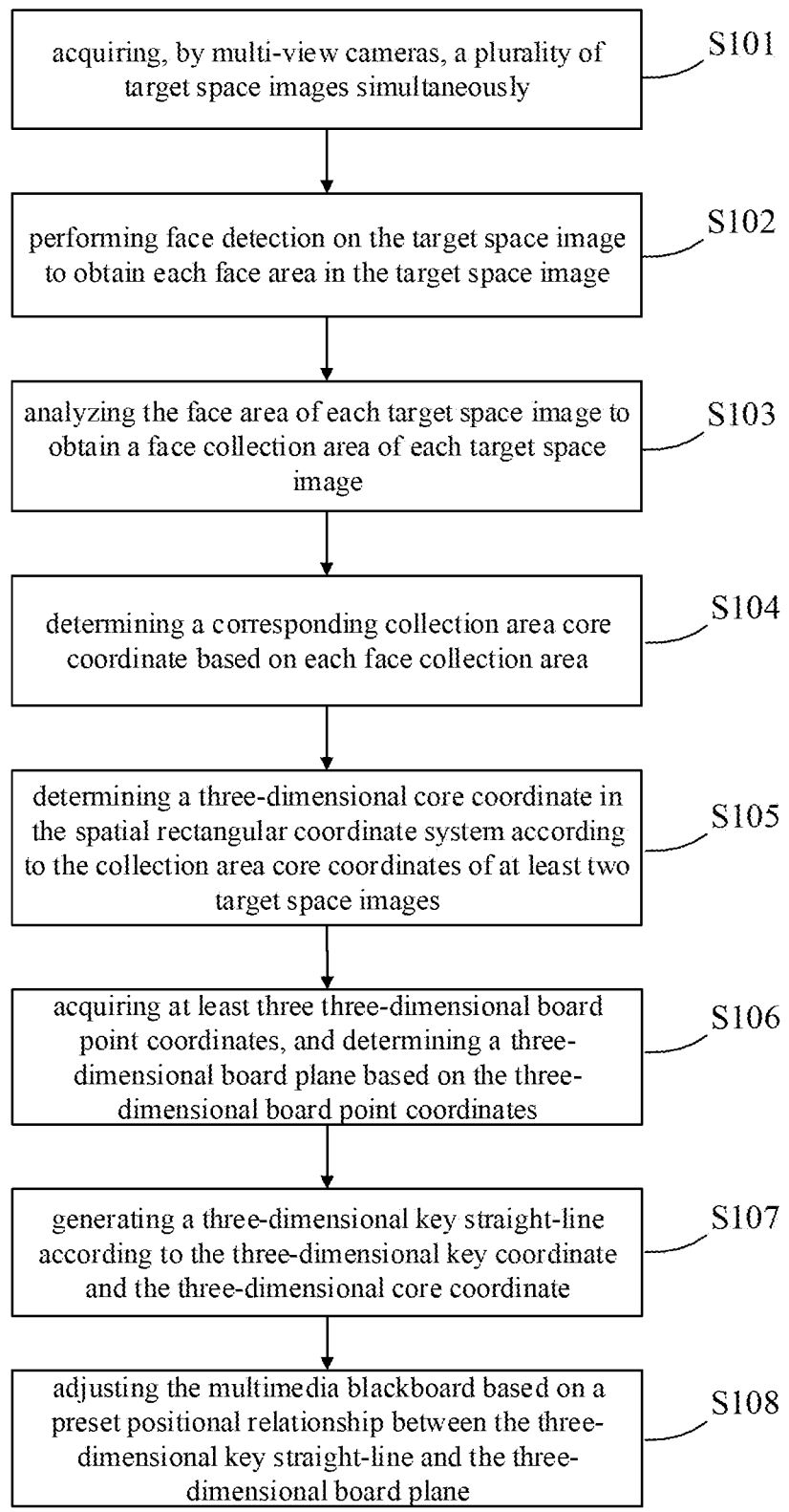
FIG. 1 shows a flowchart of a method for adaptively controlling a multimedia blackboard according to an embodiment of the present disclosure.

Hereinafter, embodiments of the present disclosure will be described in more detail with reference to the drawings. Although some embodiments of the present disclosure are shown in the drawings, it should be understood that the present disclosure may be implemented in various forms and should not be construed as being limited to the embodiments set forth herein, but rather these embodiments are provided for more thorough and complete understanding of this disclosure. It should be understood that the drawings and embodiments of the present disclosure are only for exemplary purposes, and are not intended to limit the claimed scope of the present disclosure.

It should be understood that the steps recorded in this publicly available method implementation modality can be performed in different order and/or in parallel. In addition, the method implementation may include additional steps and/or omit the steps shown for execution. The scope of this disclosure is unrestricted in this respect.

The term "include" used in this paper and its deformation is open to include, i.e. "include but not limited to". The term "based" is "at least partially based". the term "one embodiment" means "at least one embodiment"; the term "another embodiment "means" at least one other embodiment"; and the term "some embodiments" means "at least some embodiments". Relevant definitions of other terms are given in the following description.

It is important to note that the concepts of "first" and "second" mentioned in this disclosure are only used to distinguish between different devices, modules or units and are not used to define the order or interdependence of the functions performed by these devices, modules or units.

It should be noted that the modification of "one", "multiple" mentioned in this disclosure is indicative rather than restrictive, and the technical staff in this field should understand that it should be understood as "one or more" unless otherwise specified in the context.

The names of messages or information that interact with multiple devices in this public implementation are used only for illustrative purposes and not for limiting the scope of such messages or information.

Hereinafter, embodiments of the present disclosure will be described in detail with reference to the drawings.

The embodiment provided by the present disclosure is an embodiment of a method for adaptively controlling a multimedia blackboard.

The embodiments of the present disclosure will be described in detail below with reference to FIGS. 1 to 5.

To adaptive controlling a multimedia blackboard to a preset position in a target space, e.g., a classroom, a spatial rectangular coordinate system needs to be first established in the target space. Then, a three-dimensional model may be established, that is, a target in the target space may be incorporated into the spatial rectangular coordinate system to be under management. For example, a multimedia blackboard in a classroom may be under management in a spatial rectangular coordinate system. Therefore, before adaptively controlling a multimedia blackboard, the embodiments of the present disclosure provide a step of establishing a three-dimensional model of a target space, including the following steps:

Step S100, determining a spatial rectangular coordinate system, determining three-dimensional board point coordinates according to a preset board point of a multimedia blackboard, and determining a three-dimensional key coordinate according to the preset key point of a multimedia blackboard.

The spatial rectangular coordinate system includes: an origin, a horizontal axis, a vertical axis, and a longitudinal axis. The original horizontal plane is a plane determined by the horizontal axis and the vertical axis. For example, with reference to FIG. 4, the horizontal axis is x axis, the vertical axis is y axis, and the longitudinal axis is z axis; the original horizontal plane is xoz plane.

An origin of the spatial rectangular coordinate system may be set at any position in space.

Figure 2:
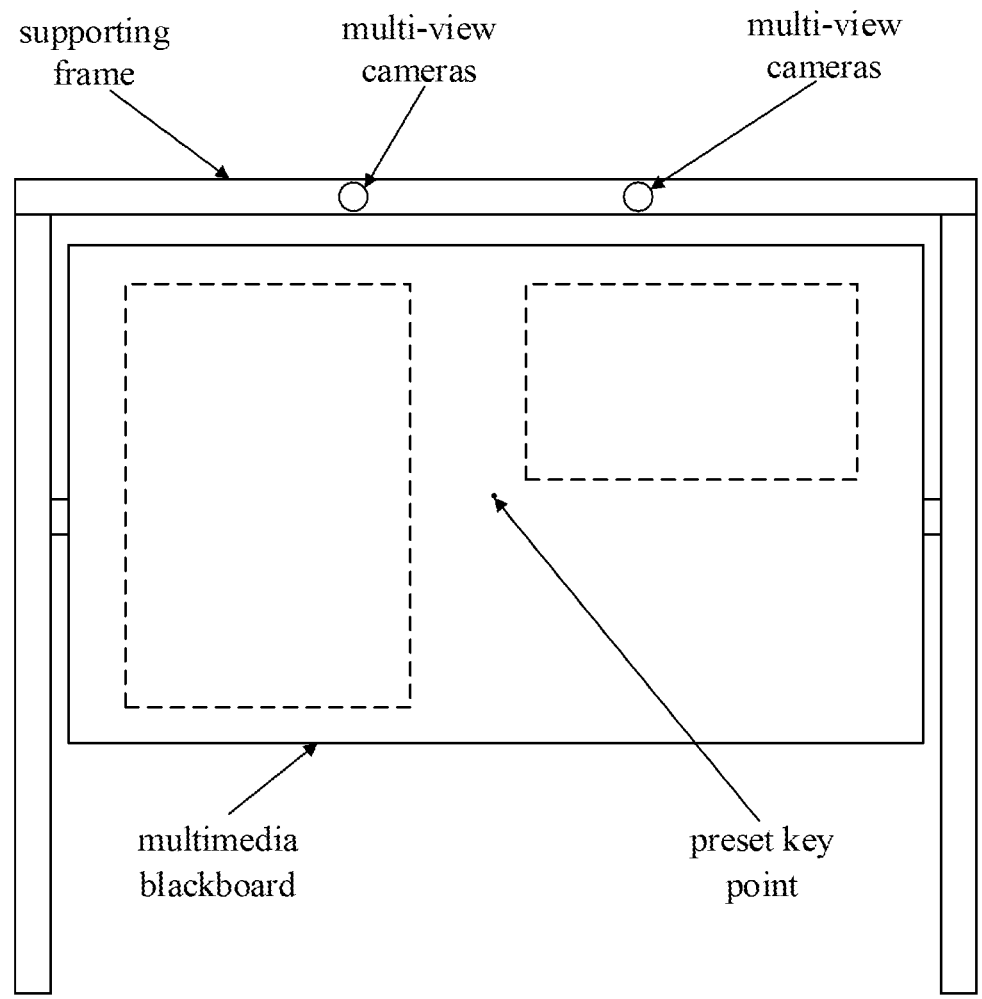
FIG. 2 illustrates a front view of an adaptive multimedia blackboard according to a method of adaptively controlling a multimedia blackboard according to an embodiment of the present disclosure.
Figure 3:
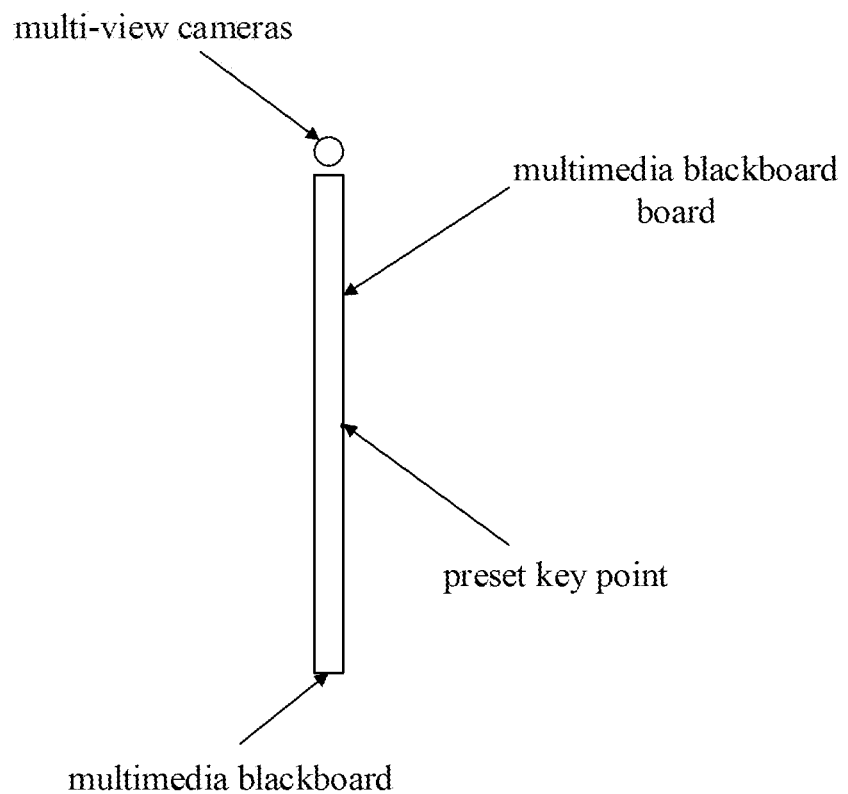
FIG. 3 illustrates a side view of an adaptive multimedia blackboard according to a method of adaptively controlling a multimedia blackboard according to an embodiment of the present disclosure.

With reference to FIG. 2 and FIG. 3, the adaptive multimedia blackboard may at least include: a multimedia blackboard, a supporting frame and multi-view cameras. The multi-view cameras are horizontally and linearly fixed on the supporting frame of the multimedia blackboard, and the optical axis of the multi-view cameras is parallel to the original horizontal plane of the spatial rectangular coordinate system. The multi-view cameras include at least two cameras for measuring a distance to a designated target point in the target space, and then generating the coordinate of the designated target point in a spatial rectangular coordinate system.

To facilitate the establishing of the three-dimensional model in the target space, in some embodiments, the method includes the following steps:

Step S100-1, determining a leftmost camera in the shooting direction of the multi-view cameras as the origin of the spatial rectangular coordinate system.

The preset board point may be a point for determining a board plane of the multimedia blackboard. Therefore, at least three preset board points may be set on the board of the multimedia blackboard. The three-dimensional board point coordinates are the coordinates corresponding to the preset board points on the multimedia blackboard board. The preset board point includes a preset key point, and the three-dimensional board point coordinates include three-dimensional key coordinates corresponding to the preset key point. The preset key point in the embodiment of the present disclosure is a point where a concentration of the student's sights on the multimedia blackboard is relatively high. For example, the preset key point is a symmetrical center of the board of the multimedia blackboard. When an origin of the spatial rectangular coordinate system is established on the multimedia blackboard, for example, a leftmost camera in the shooting direction of the multi-view cameras is determined as the origin of the spatial rectangular coordinate system, the three-dimensional board point coordinates of the preset board point in the spatial rectangular coordinate system may be determined by measurement when the three-dimensional model is initialized.

With the three-dimensional model of a specific target space established by the steps described above, with reference to FIG. 1, the embodiments of the present disclosure provide a method for adaptively controlling a multimedia blackboard based on the three-dimensional model includes the following steps:

Step S101, acquiring, by multi-view cameras, a plurality of target space images simultaneously.

For example, the target space may be a space occupied by the students sitting in the classroom. In other words, each camera in the multi-view cameras may capture the space occupied by the students sitting in the classroom.

The acquired target space images may be images obtained by capturing the target space at the same moment by each camera in the multi-view cameras respectively, with the object to obtain the stationary information of the students in the classroom at one moment, so as to obtain an accurate three-dimensional core coordinate.

Step S102, performing face detection on the target space image to obtain each face area in the target space image.

Detailed description on the procedure of performing face detection on the target space image would be omitted, and reference can be made on various implementations in the prior art.

Figure 4:
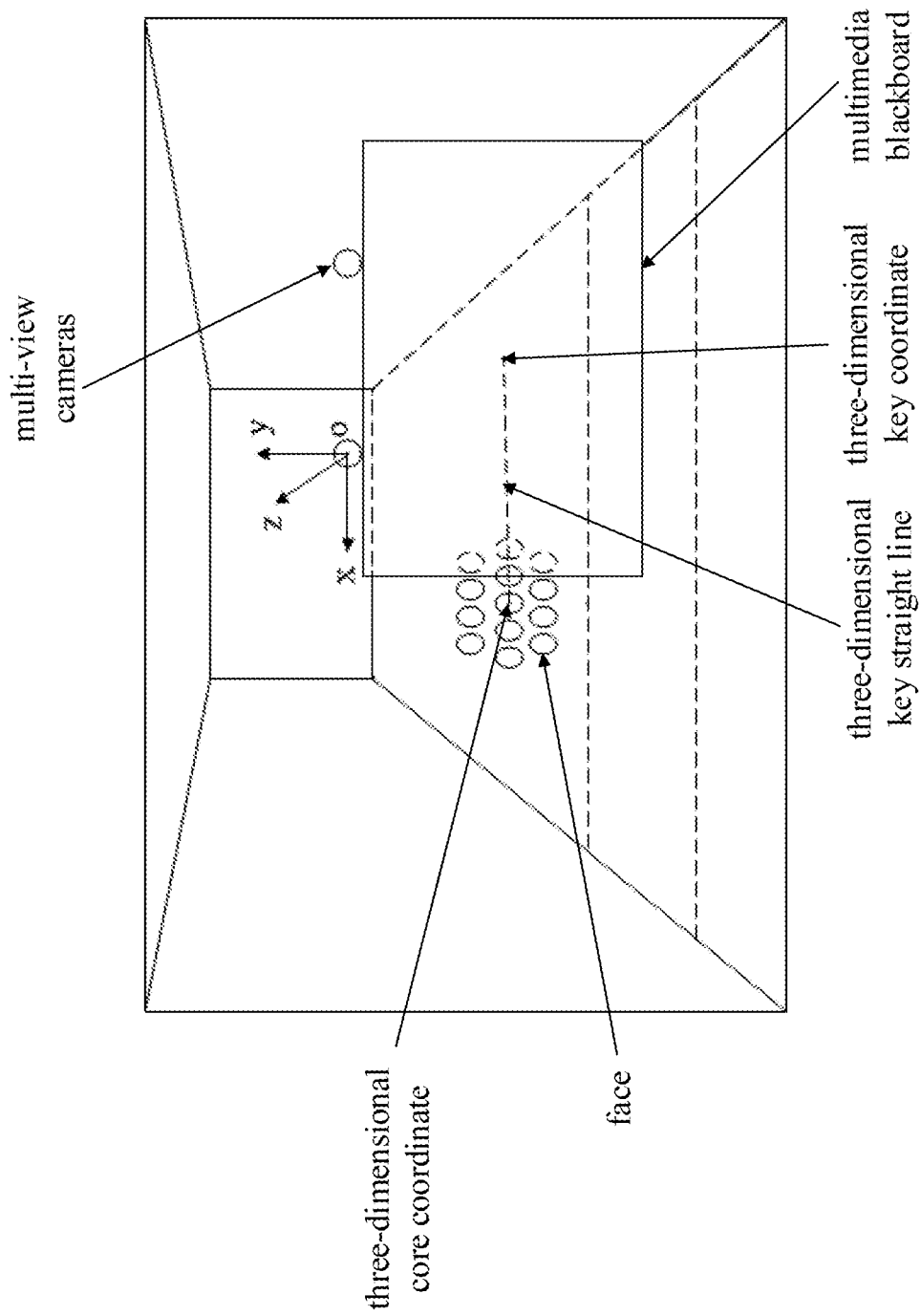
FIG. 4 illustrates a schematic diagram of a target space according to a method of adaptively controlling a multimedia blackboard according to an embodiment of the present disclosure.

With reference to FIG. 4, the face area may be a face area of human being sitting in the classroom recorded in the target space image.

Step S103, analyzing the face area of each target space image to obtain a face collection area of each target space image.

The face collection area may be an area occupied by the connected face areas meeting a preset condition in the target space image.

In some embodiments, the analyzing the face area of each target space image to obtain a face collection area of each target space image includes the following steps:

Step S103-1, calculating an interval between each face area and its surrounding face areas in the target space image, and obtaining associated face areas associated by the interval.

Figure 5:
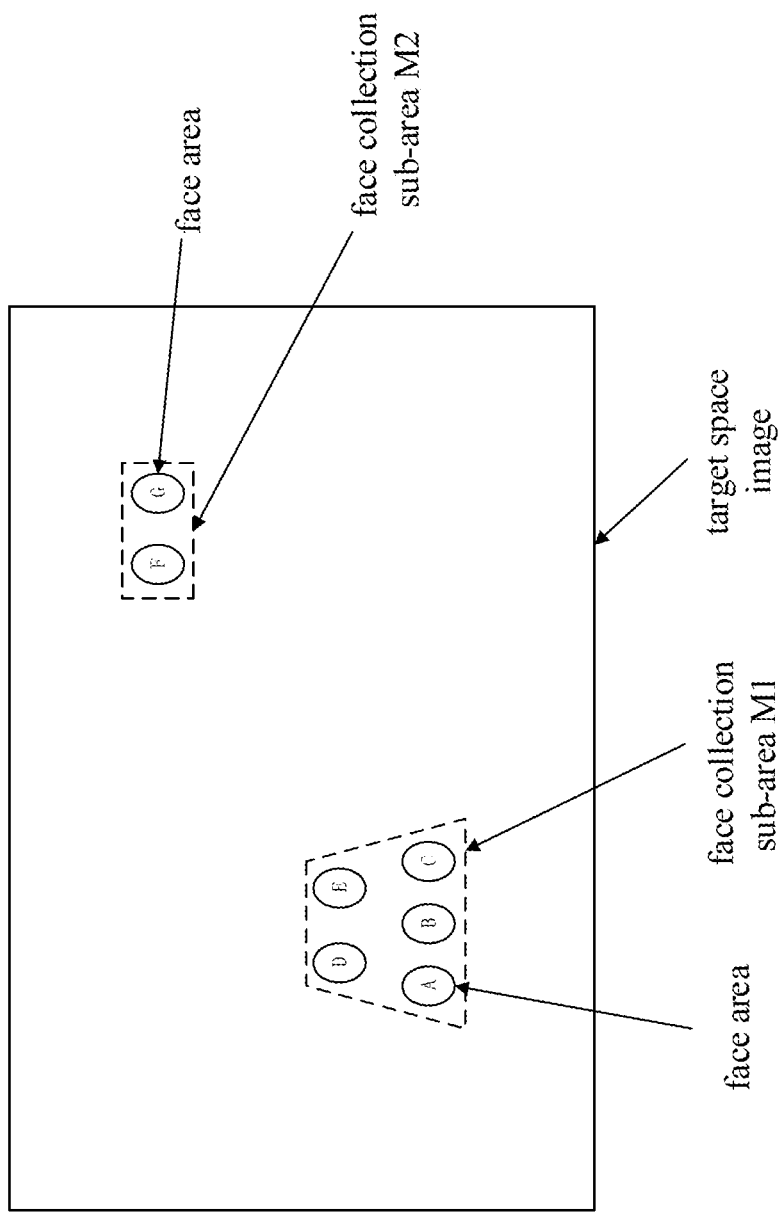
FIG. 5 illustrates a schematic diagram of a target space according to a method of adaptively controlling a multimedia blackboard according to an embodiment of the present disclosure.

For example, as shown in FIG. 5, the target space image includes: a face area A, a face area B, a face area C, a face area D, a face area E, a face area F, and a face area G. The face areas (that is, the associated face areas) around the face area A includes: a face area B, a face area D and a face area E, and the interval between the face area A and the face area B is 20 pixels, and the interval between the face area A and the face area D is 25 pixels, and the interval between the face area A and the face area E is 40 pixels. The face areas (that is, the associated face areas) around the face area B includes: a face area A, a face area C, a face area D, and a face area E, and the interval between the face area B and the face area A is 20 pixels, the interval between the face area B and the face area C is 20 pixels, and the interval between the face area B and the face area D is 25 pixels, the interval between the face area B and the face area E is 25 pixels. Therefore, intervals and associated face areas corresponding to the face area C, the face area D, the face area E, the face area F, and the face area G may be as described above. More particularly, the face areas (i.e., the associated face areas) around the face area F includes: a face area C, a face area D, a face area E, and a face area G, and the interval between the face area F and the face area C is 1000 pixels, the interval between the face area F and the face area D is 1000 pixels, the interval between the face area F and the face area E is 950 pixels, and the interval between the face area F and the face area G is 20 pixels.

Step S103-2, obtaining face areas with an interval less than or equal to a preset interval threshold and associated face areas, and aggregating the face areas and the associated face areas into a face collection sub-area.

For example, with reference to the above example, a preset interval threshold may be 60 pixels. The face area A, the face area B, the face area C, the face area D, and the face area E meet the conditions (that is, the interval is less than or equal to a preset interval threshold), and these face areas may be aggregated into a face collection sub-area M1. The face area F and the face area G may be aggregated into a face collection sub-area M2.

When a face area does not meet the conditions, it cannot be aggregated in to a face collection sub-area.

Step S103-3, obtaining a total number of face areas in the target space image and a number of faces in the face areas in each face collection sub-area.

For example, with reference to the above example, the total number of face areas is 7, in which the number of faces in the face collection sub-are M1 is 5 and the number of faces in the face collection sub-area M2 is 2.

Step S103-4, calculating a face occupation rate corresponding to the face collection sub-area based on the total number of the face areas and the number of faces, respectively.

For example, with reference to the above example, the face occupation rate (N1) corresponding to the face collection sub-area M1 is 71.43%, and the face occupation rate (N2) corresponding to the face collection sub-area M2 is 28.57%.

Step S103-5, determining a maximum face occupation rate as an initial sum of face occupation rates, and calculating the sum of face occupation rates in order from large to small, and generating the face collection area according to the face collection sub-area associated with the sum of face occupation rates, when the sum of face occupation rates is larger than or equal to a preset occupation rate threshold.

For example, with reference to the above example, the preset occupation rate threshold is 60%. In the target space image, the face occupation rates ranked from large to small are: N1, 71.43% and N2, 28.57%. Since N1 is the largest face occupation rate, N1 is determined as the initial sum of face occupation rates, and N1 is greater than 60%. Therefore, the face collection sub-area M1 associated with N1 is the face collection area. If N1 is less than 60%, N1 and N2 are added together to obtain the sum of face occupation rates, and then compare the sum of face occupation rates with 60%, and such processing is repeated gradually until the sum of face occupation rates is greater than or equal to 60%. If N1 and N2 are added together to obtain a sum of face occupation rates greater than or equal to 60%, the face collection sub-area M1 associated with N1 and the face collection sub-area M2 associated with N2 may be grouped to form the face collection area.

Step S104, determining a corresponding collection area core coordinate based on each face collection area.

In some embodiments, the face collection area may be a center-symmetric figure, and the collection area core coordinate includes a plane-symmetric center coordinate of the center-symmetric figure.

In the plane, a figure may be rotated by 180° around a point. If the rotated figure can coincide with the original figure, then this figure is called the center-symmetric figure, and this point is called a symmetry center. The coordinates of the symmetry center in the plane are called planar symmetry center coordinate.

The determining a corresponding collection area core coordinate based on each face collection area includes the following steps:

Step S104-1: analyzing each center-symmetric figure to obtain a planar symmetry center coordinate of the center-symmetric figure.

Step S105, determining a three-dimensional core coordinate in the spatial rectangular coordinate system according to the collection area core coordinates of at least two target space images.

Detailed description on the method for determining spatial coordinates by using multi-view cameras would be omitted in the embodiments of the present disclosure and reference can be made to various implementation in the prior art.

Step S106, acquiring at least three three-dimensional board point coordinates, and determining a three-dimensional board plane based on the three-dimensional board point coordinates.

In the spatial rectangular coordinate system, the three-dimensional board plane may be used to represent a plane of the multimedia blackboard board.

The three-dimensional board point coordinates include a three-dimensional key coordinate corresponding to the preset key point.

Step S107, generating a three-dimensional key straight-line according to the three-dimensional key coordinate and the three-dimensional core coordinate.

The three-dimensional key coordinate is a coordinate of a preset key-point in the spatial rectangular coordinate system of the board of the multimedia blackboard.

Step S108, adjusting the multimedia blackboard based on a preset positional relationship between the three-dimensional key straight-line and the three-dimensional board plane.

In some embodiments, the preset positional relationship includes the three-dimensional key straight line is perpendicular to the three-dimensional board plane and intersects the three-dimensional key coordinate.

The adjusting the multimedia blackboard based on a preset position relationship between the three-dimensional key straight line and the three-dimensional board plane includes the following steps:

Step S108-1, adjusting the multimedia blackboard so that the three-dimensional key straight line is perpendicular to the three-dimensional board surface plane and intersects with the three-dimensional key coordinate.

In other words, eyes at the three-dimensional core coordinate have better effect in looking at the multimedia blackboard.

After adjusting the multimedia blackboard, the method further includes the following steps:

acquiring and storing the three-dimensional board point coordinate corresponding to a preset board point after adjustment.

Since a position of the preset board point may change after each adjustment of the multimedia blackboard, in order to ensure that a valid three-dimensional board point coordinates and a three-dimensional key coordinate may be obtained next time the multimedia blackboard is adjusted, in the embodiments of the present disclosure, a new three-dimensional board point coordinate of the preset board point in the spatial rectangular coordinate system may be recalculated after each adjustment. When adjusting, the three-dimensional board point coordinate by calculating a preset board point adjustment movement trajectory.

In the present disclosure, a three-dimensional model of a target space is established, and a distribution area of the students in a classroom may be obtained by an adaptive algorithm based on the three-dimensional model and an angle of the multimedia blackboard may be automatically controlled to ensure that the students can watch the multimedia blackboard better and reduce the fatigue feeling about the class, which helps in improving an efficiency of having the class.

Corresponding to the embodiment provided by the present disclosure, the present disclosure further provides a embodiment, that is, a device for adaptively controlling a multimedia blackboard. Since the embodiment is similar to the other embodiment, the description would be relatively simple. The description of related parts may refer to the corresponding description in the embodiment. The embodiment related to the device described below are only schematic.

Figure 6:
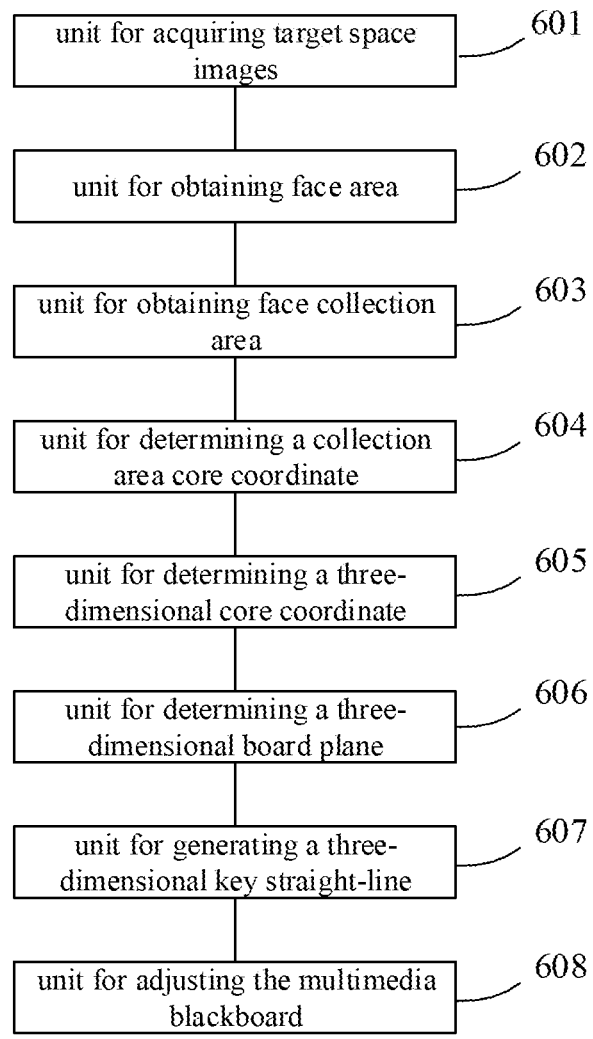
FIG. 6 illustrates a block diagram of a face collection area according to a method for adaptively controlling a multimedia blackboard according to an embodiment of the present disclosure.

FIG. 6 illustrates an embodiment of a device for adaptively controlling a multimedia blackboard provided by the present disclosure.

With reference to FIG. 6, the present disclosure provides a device for adaptively controlling a multimedia blackboard, including: a unit for acquiring target space images 601, a unit for obtaining face area 602, a unit for obtaining face collection area 603, a unit for determining a collection area core coordinate 604, a unit for determining a three-dimensional core coordinate 605, a unit for determining a three-dimensional board plane 606, a unit for generating a three-dimensional key straight-line 607, a unit for adjusting the multimedia blackboard 608.

The unit for acquiring target space images 601 is configured to acquire, by multi-view cameras, a plurality of target space images simultaneously, wherein, the multi-view cameras are arranged horizontally in line, and the optical axis of the multi-view cameras are parallel to the original horizontal plane of a spatial rectangular coordinate system; the spatial rectangular coordinate system includes: an origin, a horizontal axis, a vertical axis, and a longitudinal axis, the original horizontal plane is a plane determined by the horizontal axis and the vertical axis.

The unit for obtaining face area 602 is configured to perform face detection on the target space image to obtain each face area in the target space image.

The unit for obtaining face collection area 603 is configured to analyze the face area of each target space image to obtain a face collection area of each target space image.

The unit for determining a collection area core coordinate 604 is configured to determine a corresponding collection area core coordinate based on each face collection area.

The unit for determining a three-dimensional core coordinate 605 is configured to determine a three-dimensional core coordinate in the spatial rectangular coordinate system according to the collection area core coordinates of at least two target space images.

The unit for determining a three-dimensional board plane 606 is configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point.

The unit for generating a three-dimensional key straight-line 607 is configured to generate a three-dimensional key straight-line according to the three-dimensional key coordinate and the three-dimensional core coordinate.

The unit for adjusting the multimedia blackboard 608 is configured to adjust the multimedia blackboard based on a preset positional relationship between the three-dimensional key straight-line and the three-dimensional board plane.

In some embodiments, the unit for obtaining face collection area 603 includes:

a subunit for obtaining an interval and associated face areas, configured to calculate an interval between each face area and its surrounding face areas in the target space image, and obtain associated face areas associated by the interval.

a subunit for aggregating into a face collection sub-area, configured to obtain face areas with an interval less than or equal to a preset interval threshold and associated face areas, and aggregate the face areas and the associated face areas into a face collection sub-area.

a subunit for obtaining facial parameters, configured to obtain a total number of face areas in the target space image and a number of faces in the face areas in each face collection sub-area.

a subunit for calculating a face occupation rate, configured to calculate a face occupation rate corresponding to the face collection sub-area based on the total number of the face areas and the number of faces, respectively.

a subunit for generating face collection area, configured to determine a maximum face occupation rate as an initial sum of face occupation rates, and calculate the sum of face occupation rates in order from large to small, and generate the face collection area according to the face collection sub-area associated with the sum of face occupation rates, when the sum of face occupation rates is larger than or equal to a preset occupation rate threshold.

In some embodiments, the face collection area may be a center-symmetric figure, and the collection area core coordinate includes a plane-symmetric center coordinate of the center-symmetric figure.

The unit for determining a collection area core coordinate 604 includes:

a subunit for obtaining a planar symmetry center coordinate, configured to analyze each center-symmetric figure to obtain a planar symmetry center coordinate of the center-symmetric figure.

In some embodiments, the preset positional relationship includes the three-dimensional key straight line is perpendicular to the three-dimensional board plane and intersects the three-dimensional key coordinate.

The unit for adjusting the multimedia blackboard 608 includes:

a subunit for adjusting the multimedia blackboard, configured to adjust the multimedia blackboard so that the three-dimensional key straight line is perpendicular to the three-dimensional board surface plane and intersects with the three-dimensional key coordinate.

In some embodiments, the device further includes:

a unit for establishing a three-dimensional model, configured to determine a spatial rectangular coordinate system and determine three-dimensional board point coordinates according to a preset board point, and determine a three-dimensional key coordinate according to the preset key point.

In some embodiments, the unit for establishing a three-dimensional model includes:

a subunit for determining an origin, configured to determine a leftmost camera in the shooting direction of the multi-view cameras as the origin of the spatial rectangular coordinate system.

In the present disclosure, a three-dimensional model of a target space is established, and a distribution area of the students in a classroom may be obtained by an adaptive algorithm based on the three-dimensional model and an angle of the multimedia blackboard may be automatically controlled to ensure that the students can watch the multimedia blackboard better and reduce the fatigue feeling about the class, which helps in improving an efficiency of having the class.

The embodiments of the present disclosure provide a embodiment, that is, an electronic apparatus for a method for adaptively controlling a multimedia blackboard. The electronic apparatus includes: at least one processor, and a storage device, which is communicational connected with the at least one processor, and configured to store instructions executable by the at least one processor, which enable the at least one processor to implement the method for adaptively controlling a multimedia blackboard as described in the embodiment, upon being executed by the at least one processor.

The embodiments of the present disclosure provide a embodiment, that is, a computer storage medium for adaptively controlling a multimedia blackboard. The computer storage medium stores computer-executable instructions that can perform the method for adaptively controlling a multimedia blackboard as described in the embodiment.

Figure 7:
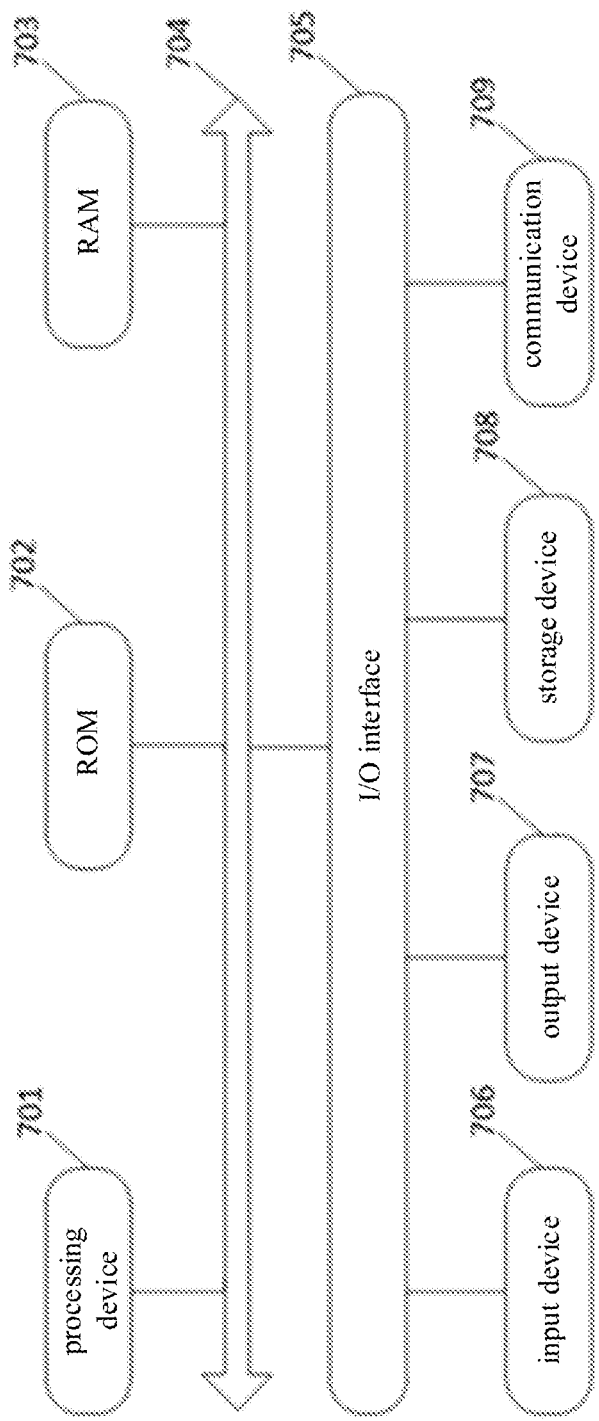
FIG. 7 is a schematic diagram showing a connection structure of an electronic apparatus according to an embodiment of the present disclosure.

With reference to FIG. 7, which illustrates a schematic structural diagram showing a connection structure of an electronic apparatus suitable for implement an embodiment of the present disclosure. The terminal apparatus in the embodiment of the present disclosure may include, but is not limited to, mobile terminals, such as a mobile phone, a notebook computer, a digital broadcast receiver, a PDA (Personal Digital Assistant), a PAD (Tablet Computer), a PMP (Portable Multimedia Player), a vehicle terminal (for example car navigation terminal) and stationary terminals such as digital TV, desktop computer. The electronic apparatus shown in FIG. 7 is only an example, and should not impose any limitation on the functions and scope of use of the embodiments of the present disclosure.

As shown in FIG. 7, the electronic apparatus may include a processing device 701, such as a central processing unit, a graphics processor, which may perform various actions and processing according to programs stored in a read-only memory (ROM) 702 or programs loaded from a storage device 708 to a random access memory (RAM) 703. Various programs and data necessary for the operations of the electronic apparatus may further stored in the RAM 703. The processing device 701, the ROM 702, and the RAM 703 are connected to each other through a bus 704. An input/output (I/O) interface 705 is further connected to the bus 704.

Generally, the following devices may be connected to the I/O interface 705: an input device 706, including e.g., touch screen, touch pad, keyboard, mouse, camera, microphone, accelerometer, gyroscope, etc.; an output device 707 including e.g., a liquid crystal display (LCD), speakers, vibrators, etc.; a storage device 708 including e.g., a magnetic tape, a hard disk, and the like; and a communication device 709. The communication device 709 may allow the electronic apparatus to perform wireless or wired communication with other apparatuses to exchange data. Although FIG. 7 shows an electronic apparatus having various devices, it should be understood that it is not required to implement or have all the devices as shown. More or fewer devices may be implemented or provided alternatively.

In particular, according to an embodiment of the present disclosure, the process described above with reference to the flowchart may be implemented as a computer software program. For example, embodiments of the present disclosure include a computer program product including a computer program carried on a non-transitory computer-readable medium. The computer program contains program codes for performing a method shown in the flowcharts. In such an embodiment, the computer program may be downloaded and installed from network through the communication device 709, or installed from the storage device 708, or installed from the ROM 702. When the computer program is executed by the processing device 701, the above functions defined in the method of the embodiments of the present disclosure are executed.

It should be noted that this disclosure of the above computer readable media may be a computer readable signal medium or a computer readable storage medium or any combination of the above. Computer readable storage media such as a system, device or device that can be, but not limited to, electricity, magnetism, light, electromagnetic, infrared, or semiconductor, or any combination of more than one. More specific examples of computer readable storage media may include, but are not limited to: electrical connections with one or more conductors, portable computer disks, hard drives, random access memory (RAM), read-only memory (ROM), erasable programmable read-only memory (EPROM or flash), optical fibers, portable compact disk read-only memory (CD-ROM), optical memory devices, magnetic memory devices, or any of the appropriate combinations described above. In this disclosure, a computer-readable storage medium may be any tangible medium containing or storing a program that may be directed for use by or in combination with an execution system, device or device. In this disclosure, the computer readable signal medium may include data signals propagated in the baseband or as part of the carrier, which carry computer readable program code. Such propagated data signals can take many forms, including but not limited to electromagnetic signals, optical signals, or any suitable combination of the above. A computer-readable signal medium may also be any computer-readable medium other than a computer-readable storage medium which may transmit, propagate or transmit a program for use or in combination with an instruction-executing system, device or device. Program code contained on a computer readable medium may be transmitted with any appropriate medium, including but not limited to: wires, optical cables, RF(rf), etc., or any suitable combination of the above.

In some embodiments, the client, server may communicate using any currently known or future developed network protocol such as the HTTP (hypertext transfer protocol, hypertext transfer protocol) and may interconnect with digital data communications (e.g., communication networks) of any form or medium. Examples of communication networks include local area networks ("LAN""), wide area networks ("WAN""), internet networks (e.g., internet), and end-to-end networks (e.g., ad hoc end-to-end networks), as well as any currently known or future developed networks.

The computer readablereadable medium mentioned above may be contained in the electronic device mentioned above; It may also exist separately without being fitted to the electronic device.

One or more programming languages, or combinations thereof, can be used to code computer programs used to perform operations in this disclosure, including, but not limited to, object-oriented programming languages such as Java, Smalltalk, C, and conventional procedural programming languages such as "C" languages or similar programming languages. Program code can be executed completely on the user computer, partially on the user computer, as a separate package, partially on the user computer, or completely on the remote computer or server. Where a remote computer is involved, a remote computer can be connected to a user computer through any kind of network—including a local area network (LAN) or a wide area network (WAN)-or to an external computer (e.g. via the Internet using an Internet service provider).

Flowcharts and block diagrams in the attached drawings illustrating the possible implementation architecture, functions and operations of systems, methods and computer program products in accordance with the various embodiments disclosed herein. At this point, each box in a flow chart or block diagram can represent a module, program segment, or part of a code that contains one or more executable instructions for implementing a specified logical function. It should also be noted that in some of the replacement implementations, the functions marked in the box can also occur in a different order from those marked in the accompanying drawings. For example, two boxes represented consecutively can actually be executed essentially in parallel, and sometimes in reverse order, depending on the function involved. it is also important to note that each box in the block diagram and/or flow chart, as well as a combination of boxes in the block diagram and/or flow chart, can be implemented with a dedicated hardware-based system performing specified functions or operations, or with a combination of dedicated hardware and computer instructions.

The units described in this public embodiment can be implemented either software or hardware. where the name of the unit does not in some case constitute a qualification of the unit itself.

The functions described above in this paper can be performed at least partially by one or more hardware logic components. non-restrictive, hardware logic components of the demonstration type that can be used include: field programmable gate arrays (FPGA), dedicated integrated circuits (ASIC), dedicated standard products (ASSP), on-chip systems (SOC), complex programmable logic devices (CPLD), etc.

In the context of this disclosure, a machine readable medium may be a tangible medium that may contain or store programs for use by the instruction execution system, device or device or in combination with the instruction execution system, device or device. Machine readable media can be machine readable signal media or machine readable storage media. Machine readable media may include, but are not limited to, electronic, magnetic, optical, electromagnetic, infrared, or semiconductor systems, devices or devices, or any suitable combination of the above. More specific examples of machine readable storage media will include electrical connections based on one or more lines, portable computer disks, hard drives, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above.

The above description is only a preferred embodiment of the present disclosure and an explanation of the applied technical principles. Those skilled in the art should understand that the scope of the disclosure involved in this disclosure is not limited to the technical solution of the specific combination of the above technical features, but also covers other technical solutions formed by any combination of the above technical features or their equivalent features without departing from the above-mentioned disclosure concepts. For example, a technical solution formed by replacing the above features with technical features disclosed in the present disclosure (but not limited to) with similar functions.

Furthermore, while operations are depicted in a particular order, this should not be understood as requiring them to be performed in the particular order shown or in sequential order. multitasking and parallel processing may be advantageous in a certain environment. Similarly, while a number of specific implementation details are included in the above discussion, these should not be interpreted as limiting the scope of this disclosure. certain features described in the context of a separate embodiment can also be implemented in combination in a single embodiment. in contrast, the various features described in the context of a single embodiment can also be implemented individually or in any appropriate sub-combination in multiple embodiments.

Although this topic has been described in a language specific to structural features and/or methodological logical actions, it should be understood that the subject defined in the accompanying claim is not necessarily limited to the particular features or actions described above. On the contrary, the specific features and actions described above are only an example form of the realization of the claim.

What is claimed is:
1. A method for adaptively controlling a multimedia blackboard, comprising:
   acquiring, by multi-view cameras, a plurality of target space images simultaneously, wherein, the multi-view cameras are arranged horizontally in line, and the optical axis of the multi-view cameras are parallel to the original horizontal plane of a spatial rectangular coordinate system; the spatial rectangular coordinate system comprises: an origin, a horizontal axis, a vertical axis, and a longitudinal axis, the original horizontal plane is a plane determined by the horizontal axis and the vertical axis;
   performing face detection on a target space image to obtain each face area in the target space image;
   analyzing the face area of each target space image to obtain a face collection area of each target space image;
   determining a corresponding collection area core coordinate based on each face collection area;
   determining a three-dimensional core coordinate in the spatial rectangular coordinate system according to the collection area core coordinates of at least two target space images;
   acquiring at least three three-dimensional board point coordinates, and determining a three-dimensional board plane based on the three-dimensional board point coordinates; the three-dimensional board point coordinates are coordinates corresponding to preset board points on the multimedia blackboard board, wherein the preset board points comprise a preset key point, and the three-dimensional board point coordinates comprise a three-dimensional key coordinate corresponding to the preset key point;

generating a three-dimensional key straight-line according to the three-dimensional key coordinate and the three-dimensional core coordinate;

adjusting the multimedia blackboard based on a preset positional relationship between the three-dimensional key straight-line and the three-dimensional board plane.

2. The method according to claim 1, wherein the analyzing the face area of each target space image to obtain a face collection area of each target space image comprises:

calculating an interval between each face area and its surrounding face areas in the target space image, and obtaining associated face areas associated by the interval;

obtaining face areas with an interval less than or equal to a preset interval threshold and associated face areas, and aggregating the face areas and the associated face areas into a face collection sub-area;

obtaining a total number of face areas in the target space image and a number of faces in the face areas in each face collection sub-area;

calculating a face occupation rate corresponding to the face collection sub-area based on the total number of the face areas and the number of faces, respectively;

determining a maximum face occupation rate as an initial sum of face occupation rates, and calculating the sum of face occupation rates in order from large to small, and generating the face collection area according to the face collection sub-area associated with the sum of face occupation rates, when the sum of face occupation rates is larger than or equal to a preset occupation rate threshold.

3. The method according to claim 2, wherein the face collection area is a center-symmetric figure, and the collection area core coordinate comprises a plane-symmetric center coordinate of the center-symmetric figure;

the determining a corresponding collection area core coordinate based on each face collection area comprises:

analyzing each center-symmetric figure to obtain a planar symmetry center coordinate of the center-symmetric figure.

4. The method according to claim 1, wherein the preset positional relationship comprises the three-dimensional key straight line is perpendicular to the three-dimensional board plane and intersects the three-dimensional key coordinate;

the adjusting the multimedia blackboard based on a preset positional relationship between the three-dimensional key straight-line and the three-dimensional board plane comprises:

adjusting the multimedia blackboard so that the three-dimensional key straight line is perpendicular to the three-dimensional board surface plane and intersects with the three-dimensional key coordinate.

5. The method according to claim 1, wherein after the adjusting the multimedia blackboard, the method further comprises:

acquiring and storing the three-dimensional board point coordinate corresponding to a preset board point after adjustment.

6. The method according to claim 1, wherein before the acquiring the target space images, the method further comprises determining a spatial rectangular coordinate system and determining three-dimensional board point coordinates according to a preset board point, and determining a three-dimensional key coordinate according to the preset key point.

7. The method according to claim 6, wherein the method further comprises:

determining a leftmost camera in the shooting direction of the multi-view cameras as the origin of the spatial rectangular coordinate system.

8. A device for adaptively controlling a multimedia blackboard, comprising:

a unit for acquiring target space images, configured to acquire, by multi-view cameras, a plurality of target space images simultaneously, wherein, the multi-view cameras are arranged horizontally in line, and the optical axis of the multi-view cameras are parallel to the original horizontal plane of a spatial rectangular coordinate system; the spatial rectangular coordinate system comprises: an origin, a horizontal axis, a vertical axis, and a longitudinal axis, the original horizontal plane is a plane determined by the horizontal axis and the vertical axis;

a unit for obtaining face area, configured to perform face detection on a target space image to obtain each face area in the target space image;

a unit for obtaining face collection area, configured to analyze the face area of each target space image to obtain a face collection area of each target space image;

a unit for determining a collection area core coordinate, configured to determine a corresponding collection area core coordinate based on each face collection area;

a unit for determining a three-dimensional core coordinate, configured to determine a three-dimensional core coordinate in the spatial rectangular coordinate system according to the collection area core coordinates of at least two target space images;

a unit for determining a three-dimensional board plane, configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points comprise a preset key point, and the three-dimensional board point coordinates comprise a three-dimensional key coordinate corresponding to the preset key point;

a unit for generating a three-dimensional key straight-line, configured to generate a three-dimensional key straight-line according to the three-dimensional key coordinate and the three-dimensional core coordinate;

a unit for adjusting the multimedia blackboard, configured to adjust the multimedia blackboard based on a preset positional relationship between the three-dimensional key straight-line and the three-dimensional board plane.

9. A non-transitory computer-readable storage medium with a computer program stored thereon, wherein the program implements the method according to claim 1 upon being executed by a processor.

10. An electronic apparatus, comprising:

one or more processors;

a storage device configured to store one or more programs, which enable the one or more processors to implement the method according to claim 1 upon being executed by the one or more processors.

\* \* \* \* \*